United States Patent [19]
Moscovici

[11] Patent Number: 4,691,275
[45] Date of Patent: Sep. 1, 1987

[54] CURRENT FED INVERTER

[75] Inventor: Poldi Moscovici, Woodcliff Lake, N.J.

[73] Assignee: Superior Manufacturing & Instrument Corporation, Maspeth, N.Y.

[21] Appl. No.: 870,377

[22] Filed: Jun. 4, 1986

[51] Int. Cl.[4] .......................................... H02M 7/04
[52] U.S. Cl. .................................... 363/143; 363/17; 363/26
[58] Field of Search ........................... 363/17, 22–26, 363/97–98, 143; 323/346

[56] References Cited
U.S. PATENT DOCUMENTS

| 4,300,191 | 11/1981 | Baranowski et al. | 363/26 X |
| 4,441,149 | 4/1984 | Hase | 323/346 X |
| 4,504,895 | 3/1985 | Steigerwald | 363/17 |

Primary Examiner—Peter S. Wong
Attorney, Agent, or Firm—George H. Gerstman

[57] ABSTRACT

A current fed inverter circuit is provided in which there are two interconnected circuits, each of which shares a common inductor and transformer primary. These interconnected circuits are arranged so that an operator selector switch can connect the two circuits in a first configuration to form a current fed half bridge circuit and in a second, different configuration, to form a current fed push-pull circuit.

18 Claims, 1 Drawing Figure

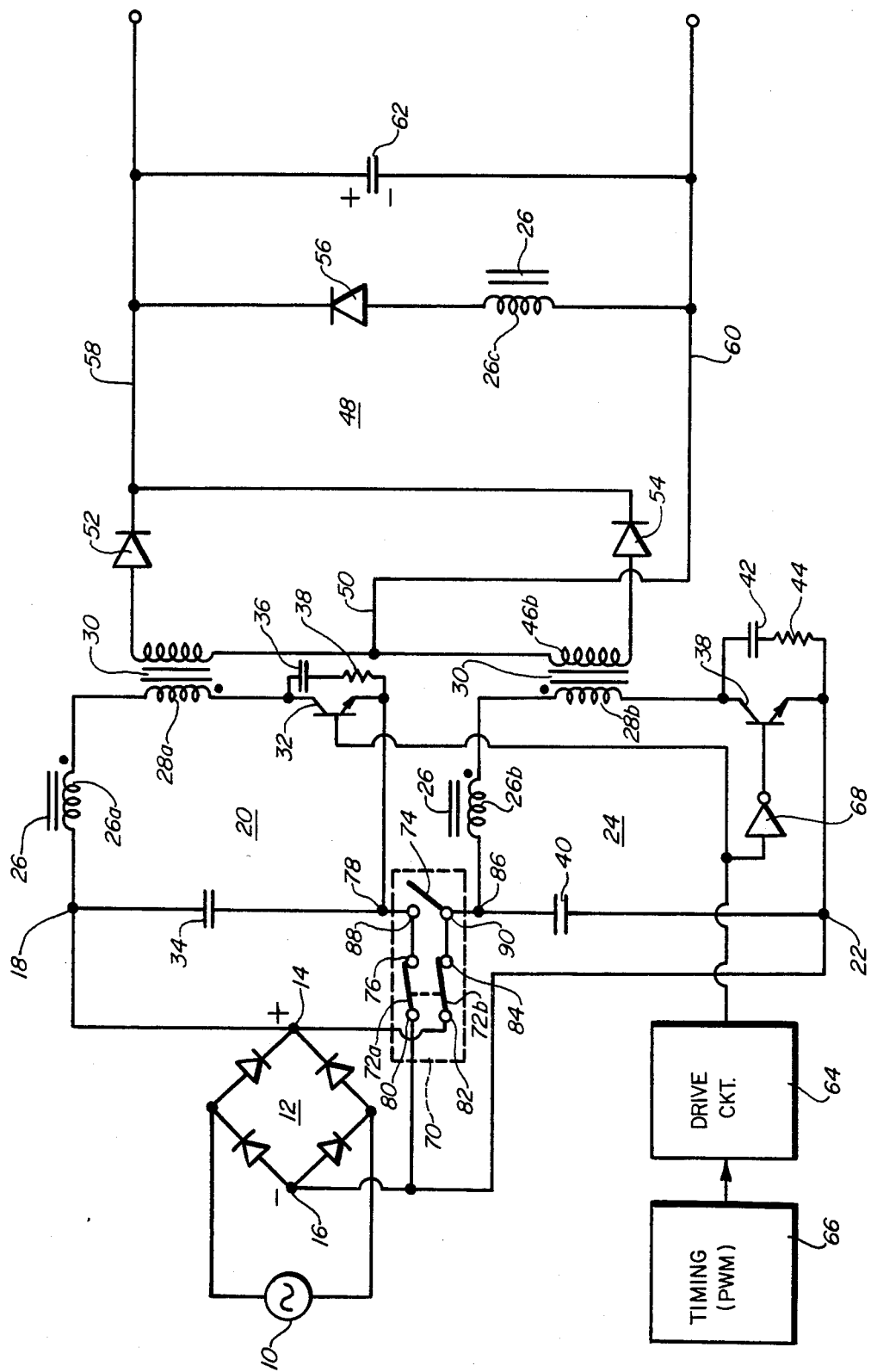

CURRENT FED INVERTER

FIELD OF THE INVENTION

The present invention concerns a novel current fed inverter circuit.

BACKGROUND OF THE INVENTION

Current fed DC to AC inverters are in widespread use today. In certain applications, a current fed half bridge circuit is desirable while in other applications a current fed push-pull circuit is desirable.

I have discovered a novel current fed inverter circuit which can be easily and rapidly changed from a half bridge configuration to a push-pull configuration.

An object of the present invention is to provide a convertible current fed inverter circuit that is easy to construct and is simple in operation.

Another object of the present invention is to provide a convertible current fed inverter circuit that is economical in construction.

Other objects and advantages of the present invention will become apparent as the description proceeds.

SUMMARY OF THE INVENTION

In accordance with the present invention, a current fed inverter circuit is provided having an input source of direct current or rectified alternating current. The inverter circuit comprises a first circuit having an inductor and a transformer primary winding and a second circuit having the inductor and the transformer primary winding. An output circuit is provided which includes a transformer secondary winding magnetically coupled to the transformer primary winding. Current flow in the first circuit and the second circuit are alternately modified. Operator selector means are provided for connecting the first and second circuits in a first configuration to form a current fed half bridge circuit and in a second, different configuration, to form a current fed push-pull circuit.

In the illustrative embodiment, the current modifying means comprises first switching means for opening and closing the first circuit, second switching means for opening and closing the second circuit, and means for alternatively controlling the first and second switching means. The controlling means comprises means for closing the first switching means when the second switching means is open and for opening the first switching means when the second switching means is closed.

In the illustrative embodiment, the output circuit includes means for rectifying the output of the secondary winding, output terminals, and a boost circuit including the inductor and a rectifier connected across the output terminals. A filter capacitor is also connected across the output terminals in parallel with the boost circuit.

In the illustrative embodiment, the first circuit includes a first point and a second point with a capacitor in series between the first and second points. The second circuit includes a third point and a fourth point with a capacitor in series between the third and fourth points. A positive terminal of the input source is connected to the first point and a negative terminal of the input source is connected to the fourth point. The operator selector means includes switching means for connecting the second point to the third point to form the half bridge configuration. When the push-pull configuration is desired, the second point is disconnected from the third point and the positive terminal is connected to the third point with the negative terminal connected to the second point.

A more detailed explanation of the invention is provided in the following description and claims, and is illustrated in the accompanying drawing.

BRIEF DESCRIPTION OF THE DRAWING

The drawing comprises a schematic circuit diagram of a current fed inverter circuit constructed in accordance with the principles of the present invention.

DETAILED DESCRIPTION OF THE ILLUSTRATIVE EMBODIMENT

Referring to the drawing, a source of alternating current 10, for example, a 230 volt AC source, is connected to a full wave rectifier 12 to provide a positive terminal 14 and a negative terminal 16. Positive terminal 14 is connected to point 18 of a first circuit 20 and negative terminal 16 is connected to point 22 of a second circuit 24.

First circuit 20 comprises an inductor 26, with winding 26a of inductor 26 being connected in series with primary winding portion 28a of transformer 30, the collector emitter circuit of transistor 32 and capacitor 34. A capacitor 36 and series connected resistor 38 are connected across the collector emitter circuit of transistor 32.

Second circuit 24 comprises winding 26b of inductor device 26 in series with portion 28b of the primary winding of transformer 30. These are in series with the collector emitter circuit of transistor 38 which is in series with capacitor 40. A capacitor 42 and series connected resistor 44 are connected across the collector emitter circuit of transistor 38.

Transformer 30 has secondary winding portions 46a and 46b which form the input to an output circuit 48. Secondary winding portions 46a and 46a are center tapped by line 50 and the opposite ends of secondary windings 46a and 46b are rectified by means of diode 52 and 54.

A boost circuit is provided by means of winding portion 26c of inductor 26 connected in series with diode 56, with winding portion 26b and diode 56 being connected across output terminals 58, 60. A filter capacitor 62 is also connected across ouput terminals 58, 60.

Transistors 32 and 38 of circuits 20 and 24, respectively, are driven by a conventional drive circuit 64 that is fed via timing circuit 66 which provides a pulse width modulated rectangular wave. Drive circuit 64 provides pulse width modulated rectangular waves that are suitable for controlling power transistors 32 and 38. The rectangular waveform that is fed to the bases of the power transistors has a variable duty cycle depending on the modulation provided by timing circuit 66 and preferably has a frequency in the range of 50 kilohertz. The rectangular waveform applied to the base of transistor 32 is a complement of the waveform that is applied to the base of transistor 38, as indicated by the inverter 68, so that one transistor will be off while the other transistor is on. The transistors act as switches to open and close the circuit.

In accordance with this invention, the inverter circuit may be used as a 230 volt half bridge circuit or a 115 volt push-pull circuit. To this end, operator selector means 70 is utilized. Operator selector means 70 is shown comprising three switches, but it is to be understood that logic gating could be used if desired. Operator selector means 70 includes switches 72a and 72b which are either both closed or both open and switch 74 which is open when switches 72a and 72b are closed and is closed when switches 72a and 72b are open. Contact 76 of switch 72a is connected to point 78 of circuit 20 and contact 80 of switch 72a is connected to negative terminal 16. Contact 82 of switch 72b is connected to positive terminal 14 and contact 84 of switch 72b is connected to point 86 of circuit 24. Contact 88 of switch 74 is connected to point 78 and contact 90 of switch 74 is connected to point 86.

Operator selector means 70 is illustrated in the 115 volt push-pull mode, in which the positive terminal 14 is connected to point 18 of circuit 20 and point 86 of circuit 24 while negative terminal 16 is connected to point 22 of circuit 24 and point 78 of circuit 20. To place the inverter circuit in its half bridge configuration, switch 74 is closed while switch 72a and switch 72b are open. In this configuration, positive terminal 14 is connected to point 18 of circuit 20, negative terminal 16 is connected to point 22 of circuit 20, and point 78 of circuit 20 is connected to point 86 of circuit 24.

It can be seen that a novel inverter circuit has been provided in which a full voltage half bridge current fed inverter circuit may easily be converted to a half voltage push-pull current fed inverter circuit. Although an illustrative embodiment of the invention has been shown and described, it is to be understood that various modifications and substitutions may be made by those skilled in the art without departing from the novel spirit and scope of the present invention.

What is claimed is:

1. A current fed inverter circuit for accommodating two different input voltages from an input source of direct current or rectified alternating current, which comprises:
    a first circuit having an inductor and a transformer primary winding; a second circuit having said inductor and said transformer primary winding;
    an output circuit including a transformer secondary winding magnetically coupled to said transformer primary winding;
    means for alternately modifying current flow in the first circuit and the second circuit; and
    operator selector means for connecting said first and second circuits in a first configuration to form a current fed half bridge circuit to accommodate the higher of the two input voltages and in a second, different configuration, to form a current fed push-pull circuit to accommodate the lower of the two input voltages.

2. A current fed inverter circuit as described in claim 1, in which said output circuit further includes means for rectifying the output of said secondary winding, output terminals, and a boost circuit including said inductor connected across the output terminals.

3. A current fed inverter circuit as described in claim 2, said output circuit further including a rectifier in series with said inductor; and a filter capacitor connected across the output terminals and in parallel with said boost circuit.

4. A current fed inverter circuit as described in claim 1, said modifying means comprising first switching means for opening and closing said first circuit; second switching means for opening and closing said second circuit; and means for alternately controlling said first and second switching means.

5. A current fed inverter circuit as described in claim 4, said controlling means comprising means for closing said first switching means when said second switching means is open and for opening said first switching means when said second switching means is closed.

6. A current fed inverter circuit as described in claim 5, said first and second switching means comprising first and second transistors, and said controlling means being coupled to the control electrodes of said transistors to place each transistor in an opposite state of conduction from the other transistor.

7. A current fed inverter circuit as described in claim 1, said input source having a positive terminal and a negative terminal; said first circuit including a first point and a second point with a capacitor in series between said first and second points; said second circuit including a third point and a fourth point with a capacitor in series between said third and fourth points; means connecting said positive terminal to said first point; means connecting said negative terminal to said fourth point; said operator selector means including switching means for connecting said second point to said third point to form the half bridge configuration, and for disconnecting said second point from said third point and connecting said positive terminal to said third point and said negative terminal to said second point to form the push-pull configuration.

8. A current fed inverter circuit for accommodating two different input voltages from an input source of direct current or rectified alternating current to provide a positive terminal and a negative terminal, which comprises:
    a first circuit having a first inductor and a first transformer primary winding;
    a second circuit having a second inductor and a second transformer primary winding;
    an output circuit including a first transformer secondary winding magnetically coupled to said first transformer primary winding and a second transformer secondary winding magnetically coupled to said second transformer primary winding;
    means for alternately modifying the current flow in the first circuit and the second circuit;
    means for connecting said positive terminal to said first circuit and said negative terminal to said second circuit;
    operator selector means for connecting said first and second circuits in a first configuration to form a current fed half bridge circuit to accommodate the higher of the two input voltages and in a second, different configuration to form a current fed push-pull circuit to accommodate the lower of the two input voltages.

9. A current fed inverter circuit as described in claim 8, said first and second inductors comprising portions of a common inductor device and said first and second transformer primary windings comprising primary windings of a single transformer.

10. A current fed inverter circuit as described in claim 8, said first and second transformer primary windings comprising primary windings of a single transformer and said first and second transformer secondary windings comprising secondary windings of said single transformer.

11. A current fed inverter circuit as described in claim 10, said output circuit further including means for rectifying the output of the secondary windings, output terminals, and a boost circuit including a third inductor and series rectifier connected across the output terminals.

12. A current fed inverter circuit as described in claim 8, said first and second inductors comprising portions of a common inductor device.

13. A current fed inverter circuit as described in claim 8, said modifying means comprising first switching means for opening and closing said first circuit; second switching means for opening and closing said second circuit; and means for alternatively controlling said first and second switching means.

14. A current fed inverter circuit as described in claim 13, said controlling means comprising means for closing said first switching means when said second switching means is open and for opening said first switching means when said second switching means is closed.

15. A current fed inverter circuit as described in claim 14, said first and second switching means comprising first and second transistors, and said controlling means being coupled to the control electrodes of said transistors to place each of said transistors in an opposite state of conduction from the other transistor.

16. A current fed inverter circuit as described in claim 8, said first circuit including a first point and a second point with a capacitor in series between said first and second points; said second circuit including a third point and a fourth point with a capacitor in series between said third and fourth points; said positive terminal being connected to said first point and said negative terminal being connected to said fourth point; said operator selector means including switching means for connecting said second point to said third point to form the half bridge configuration, and for disconnecting said second point from said third point and for connecting said positive terminal to said third point and said negative terminal to said second point to form the push-pull configuration.

17. A current fed inverter circuit for accommodating two different input voltages from an input source of direct current or rectified alternating current to provide a positive terminal and a negative terminal, comprising:
a first circuit having a first inductor and a first transformer primary winding;
a second circuit having a second inductor and a second transformer primary winding;
an output circuit including a first transformer secondary winding magnetically coupled to said first transformer primary winding and a second transformer secondary winding magnetically coupled to said second transformer primary winding;
said first and second inductors comprising portions of a common inductor device;
said first and second transformer primary windings comprising primary windings of a single transformer;
said first and second transformer secondary windings comprising secondary windings of said single transformer;
said output circuit further including means for rectifying the output of the secondary windings, output terminals, and a boost circuit including a third inductor and a series rectifier connected across the output terminals;
means for connecting said positive terminal to said first circuit and said negative terminal to said second circuit;
means for alternately modifying the current flow in the first circuit and the second circuit, said modifying means comprising first switching means for opening and closing said first circuit, second switching means for opening and closing said second circuit, and means for alternatively controlling said first and second switching means;
said controlling means comprising means for closing said first switching means when said second switching means is open and for opening said first switching means when said second switching means is closed;
said first and second switching means comprising first and second transistors, and said controlling means being coupled to the control electrodes of said transistors to place each transistor in an opposite state of conduction from the other transistor;
means for connecting said positive terminal to said first circuit and said negative terminal to said second circuit;
operator selector means for connecting said first and second circuits in a first configuration to form a current fed half bridge circuit to accommodate the higher of the two input voltages and in a second, different configuration, to form a current fed push-pull circuit to accommodate the lower of the two input voltages.

18. A current fed inverter circuit as described in claim 17, said first circuit including a first point and a second point with a capacitor in series between said first and second points; said second circuit including a third point and a fourth point with a capacitor in series between said third and fourth points; said positive terminal being connected to said first point and said negative terminal being connected to said fourth point; said operator selector means including switching means for connecting said second point to said third point to form the half bridge configuration, and for disconnecting said second point from said third point and for connecting said positive terminal to said third point and said negative terminal to said second point to form the push-pull configuration.

* * * * *